Jan. 25, 1966   G. D. PRENTICE   3,231,071
ADJUSTABLE FEED DEVICE
Filed March 9, 1964
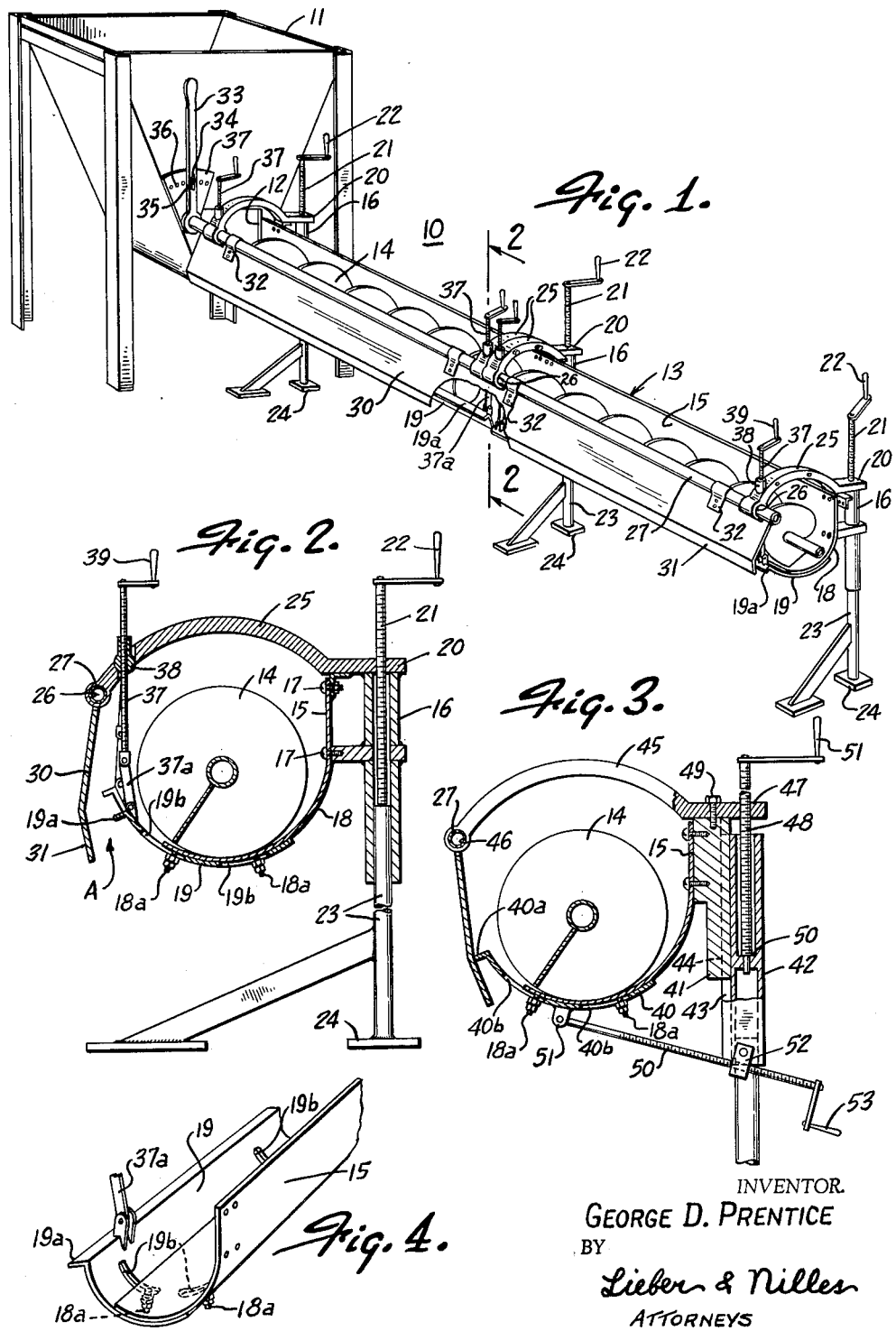
INVENTOR.
GEORGE D. PRENTICE
BY
Lieber & Nilles
ATTORNEYS

United States Patent Office 3,231,071
Patented Jan. 25, 1966

3,231,071
ADJUSTABLE FEED DEVICE
George D. Prentice, Milwaukee, Wis., assignor to A. F. Klinzing Co. Inc., Milwaukee, Wis., a corporation of Wisconsin
Filed Mar. 9, 1964, Ser. No. 350,183
9 Claims. (Cl. 198—204)

This invention relates to an auger conveyor device especially adapted for distributing feed to livestock and the like, and it relates more particularly to a conveying device for distributing feed along a feed bunker or a plurality of bunkers whereby a predetermined amount of feed is dispensed for consumption by the stock.

It is a primary object of the invention to provide an improved adjustable auger trough or conveying channel embodying means for dispensing feed in predetermined amounts along a feed bunker or the like.

Numerous prior feed devices of the auger type for dispensing feed to livestock, poultry and the like have been heretofore proposed. The primary concern of the prior art devices in the field has been the problem of feeding a substantially equal amount of feed along a feed bunker or bunkers so that the stock does not tend to concentrate at those areas of the bunker or bunkers where the greatest quantity of feed is being dispensed.

Two prior art patents of recent issue are believed to be examples of certain attempted solutions to the above problem. In Winter U.S. Patent No. 3,026,845, dated March 27, 1962, an automatic timing means is added to the feeding device, but essentially the patent relates to a stock feeder for depositing a ribbon of feed simultaneously along the entire length of a feed bunker. In an effort to accomplish this, a hinged bottom is provided for an elongated container having an auger feed conveyor therein. A cam means engaging the hinged bottom is actuated to open and close the same to discharge feed in accordance with the opening determined by the cam cycle. Additionally, for adjusting the discharge rate, a panel is slidably carried on the device relative to the hinged bottom for varying the size of the discharge opening between the panel and the bottom in accordance with selected panel setting. Essentially, this patent relates to a device having means for simultaneous opening the hinged bottom for discharging feed along the entire length of the bunker for a predetermined length of time until the hinged bottom is again moved to a closed position. This teaching, however, does not anticipate the need for varying a discharge opening to vary the discharge of feed from one bunker to the next in accordance with auger feed conditions.

Carew U.S. Patent No. 3,105,586, dated October 1, 1963, recognized the problem associated with distributing substantially equal quantities of feed from a plurality of elongated auger trough sections. In an effort to solve the equal distribution problem, the Carew patent discloses an auger containing trough or channel which is open along one side. At its open side, a hinged gate means is provided. This hinged gate means comprises a plurality of successive hinged gate sections all supported by a common gate actuating shaft, but each hinge gate section is separately adjustable to preselected degrees relative to each other along the common gate actuating shaft. Thus, one of the hinged gate sections is adjusted to provide one size of discharge opening, while another gate section is adjusted to provide a different size of discharge opening, and so on. But all the gate sections, regardless of the degree of adjustment relative to each other along the common gate supporting shaft are opened by a single actuating rod attached to said shaft. In other words, each hinged gate section must be adjusted separately on the shaft, and then the common actuating shaft is rotated to position the hinged gate sections along the entire length of the bunker to allow discharge of the feed from the auger trough. Some of the hinged sections may not be closed against the auger trough by reason of their individual adjustment and spillage of the feed during auger feeding may be encountered; and furthermore, the distribution of feed along the length of the conveyor is regulated solely by gate position and not in any way by changes in the capacity of the conveyor.

The present invention embodies a hinged gate or closure along one side of an auger or screw housing trough, and additionally provides means for effecting substantially equal feeding along the length of the auger trough without the spillage normally encountered by failing to close the hinged gate means in other commercially available devices.

It is therefore another object of the invention to provide an elongated auger feed trough having an adjustment device for varying the discharge from said feed trough by varying the capacity or volume from one section to another.

It is another object of the invention to provide an auger type conveyor having an adjustable lower run or base for varying the opening between the base of said trough and a hinged side gate.

It is a further object of the invention to provide an improved adjustable auger type feed device for dispensing substantially equal amounts of feed along the length of said trough.

It is another object of the invention to provide an adjustable support means for an auger feed trough wherein the amount of feed dispensed from said trough may be varied by adjusting said support means.

It is a further object of the invention to provide an improved conveying and feeding device for distributing feed in substantially equal amounts along the length of the feed channel in a facile and efficient manner.

These and other objects and advantages of the invention will become apparent from the following detailed description.

A clear conception of the several features constituting the present invention and of the mode of constructing and operating an auger feed device embodying the improvements may be had by referring to the drawings accompanying and forming a part of this specification, wherein like reference characters designate the same or similar parts in the various views.

FIGURE 1 is a perspective view of a typical elongated auger feed device embodying the invention;

FIGURE 2 is an elevational view in partial section taken along line 2—2 of FIGURE 1;

FIGURE 3 is a similar elevational view in partial section of a modification of the device shown in FIGURES 1 and 2; and FIGURE 4 is an enlarged fragmentary perspective of the trough of FIGURE 1.

While the improvements have been illustrated and described as being especially advantageously embodied in a livestock feeding device, it is not intended to thereby unnecessarily limit or restrict the invention as the improved feed distributing device may be used to like advantage with a variety of material to be fed. It is also contemplated that certain descriptive terminology used herein shall be given the broadest possible interpretation consistent with the disclosure.

Referring to the drawings, FIGURE 1 discloses an auger feed device, designated by the numeral 10, attached to a feed hopper or bin 11. Feed for livestock or the like is supplied to the bin 11 and is discharged through an opening 12 to the auger feed trough or conveyor channel 13. An auger 14 is located in channel 13 and extends along the length thereof, being driven and rotated by a suitable motor (not shown) or the like mounted on bin 11 or in some other suitable manner. Thus, the feed in bin 11 is discharged through opening 12 to channel 13 wherein auger 14 is rotatable to convey or carry the feed along the channel in a manner well known in the art.

The feed channel or trough 13 comprises a back plate 15 secured to an adjustable supporting frame member 16 as by fasteners 17, and a curved bottom plate 18 integral with the back plate 15. It can be seen that the trough or channel 13 may be made of a plurality of separate back plates and bottom plates attachable as at frame members 16 to extend the length of the trough or channel 13 depending on the length of a feed bunker (not shown) to which the feed is to be discharged from the trough.

Adjustable supporting frame members 16 are provided with a threaded upper flange 20 for receiving a threaded rod 21 having a rotating handle 22. The threaded rod 21 threadably engages the frame flange 20 and extends therethrough to a supporting member 23 having a base 24. As the rod is rotated by handle 22 the frame member 16 is raised or lowered relative to member 23 depending on the direction of rotation of rod 21. As the feed channel 13 is secured to frame 16, it is raised or lowered therewith to a desired distance over a feed bunker (not shown) or the like.

Integral with upper flange 20 is an arcuate supporting member 25 provided with an opening 26 to receive a shaft 27 which extends longitudinally along the back plate 15 a predetermined distance therefrom as seen in FIGURES 1 and 2. Supported on and along shaft 27 is a gate 30 having a lower lip 31. The gate 30 is ordinarily coextensive in length with the trough or channel 13. Fastener means 32 support the gate 30 on shaft 27 in such manner as to swing the gate when shaft 27 is rotated by the actuation or positioning of a gate lever 33. The lever 33 is provided with a slot 34 to allow a pin 35 to be inserted therethrough to a preselected opening 36 in gate position plate 37 mounted on bin 11.

Thus it can be seen that lever 33, in rotating shaft 27, moves the gate 30 toward or away from the outer edge 19a of curved bottom extension plate 19. The gate 30 is positioned by lever 33 the same amount along the entire extent of the gate, and forms a discharge opening A when the gate is away from the edge 19a of bottom extension plate 19.

The structure of the auger feed device 10 as described thus far would allow for a uniform opening A longitudinally along the trough 13 between the gate 30 and bottom extension plate 19. However, as it is desirable to vary the capacity of the conveyor-distributor and the sizes of the successive discharge openings along the channel or trough 13, additional structure will now be described which will provide for variations in the discharge openings along the trough as well as the capacity thereof so that substantially equal amounts of feed may be discharged along the entire length of the trough.

Referring for example to FIGURES 1 and 2, an adjusting rod 37 for the bottom plate 18 of the trough threadably engages a rod support means 38 pivotally attached to the arcuate supporting member 25. The lower end of the rod 37 is attached to bottom extension plate 19 through a link 37a to allow rotation of the rod 37 by a handle 39. As the rod 37 is rotated as by handle 39, plate extension 19 is slideably positioned relative to bottom plate 18 to thereby raise or lower the extension plate 19 relative to the bottom plate 18 depending upon the direction of rotation of rod 37. Thus, by manipulating the rods 37 along the length of the auger feed device, the discharge openings between the gate 30 and edge 19a of each section may be adjusted relative to the adjacent section; and the discharge opening for the section nearest the bin 11 may be of lesser extent than the discharge openings farther along the auger feed device with the spacing of the bottom extension plate 19 of each succeeding section from the gate 30 likewise being varied to allow uniform distribution or discharge of the feed from the channel or trough 13 throughout its length as the auger 14 is powered to convey the feed from the bin and out along the trough.

As hereinabove mentioned, additional sections of trough may be added and supported by additional supports 23 having frames 16 and supporting members 25.

In the preferred embodiment, adjusting rods 37 are provided at each end of the separate bottom plates 18, but such rods could be placed medially of the plates 18 to accomplish the adjustment thereof in substantially the same manner, the auger 14 being freely suspended along its length relative to the bottom plates 18.

Also in the preferred embodiment, the bottom extension plate 19 is provided with a plurality of elongated apertures 19b for receiving fastener members 18a attached to bottom plate 18 so that the extension plate 19 can be positioned relative to plate 18 by the rotation of rods 37 as link 37a connected to extension plate 19 is moved either upwardly or downwardly thereby. Thus to effectuate a larger discharge opening between gate 30 and edge 19a the extension plate 19 is moved toward the back plate 15, as viewed in the drawings, and to reduce the discharge opening the extension plate 19 is moved away from the back plate 15. The limits of relative sliding movement between plates 18 and 19 being determined by the longitudinal extent of the apertures 19b. For the addition of sections to channel 13, the extension plates 19 would be of the same longitudinal extent as the bottom plates 18.

A modification of an adjustment for a bottom extension plate 40 is shown in FIGURE 3 wherein a frame 41 is slideably mounted on a support rod 42, and adapted to slide longitudinally along a guide member 43 as at recess 44 in frame 41. An arcuate support member 45, provided with an opening 46 for receiving and supporting the shaft 27 and a threaded opening 47 for receiving a threaded rod 48, is carried by frame 41 and secured thereto as by fastening means 49. The threaded rod 48 is supported for rotation by a web member 50 interiorly of support rod 42. As the rod 48 is rotated by a handle 51, the frame 41 and support member 45 move upwardly or downwardly dependent upon the direction of rotation of the rod relative to threaded opening 47. The back plate 15, secured to frame 41, and the bottom extension plate 40, being slideably secured to a curved portion of plate 15, also are positionable along with the positioning of frame 41 by rod 47.

A gate 30 is pivotally supported along shaft 27 as described in conjunction with FIGURES 1 and 2, and the shaft 27 is rotatable in the same manner by means of an operating lever 33.

In FIGURE 3, the adjustment of the bottom extension plate 40 is accomplished by a threaded adjusting rod 50 rotatably attached to the extension plate 40 by an attachment means 51. The rod 50 is further supported by a threaded attachment means 52 carried by frame 41 and positionable therewith. Rod 50 may be rotated by turning handle 53 to slide or position the bottom extension plate 40 as at apertures 40b relative to fasteners 18b toward or away from the back plate 15 depending on the direction of rotation of rod 50. Thus the discharge opening between the gate 30 and edge 40a of extension plate 40 is varied as hereinabove described in conjunction with FIGURES 1 and 2.

Also, the structure of FIGURE 3 may be used for extension of the distributing device by the addition of back plates and extension plates as described hereinabove. The rods 50 may be placed at each end of a section of extension plate, or such a rod could be supported for rotation at a location medially of an auger feed section.

Thus, an auger feed device for discharging feed longitudinally therealong, and for varying the feed openings from one section to another throughout the length of the bunker to compensate for the distance of travel thereof, has been described. In both modifications, a variation in discharge opening from one section of an auger feed trough to another is occasioned by providing a means for slidably moving an extension plate or plates of a J-shaped trough in an arcuate path toward and away from the discharge side so that the trough may be vertically adjusted relative to the feed bunker. A gate extends along the entire length of the auger feed trough and swinging movement of the gate operating lever moves the gate uniformly throughout the bunker length with the variation in discharge opening being occasioned by the separate individual adjustment of the extension plates of the auger feed trough to allow substantially equal amounts of feed to be discharged along the length of the auger feed device.

The improved device has the advantage of preventing small grain seeds such as oats and the like from seeping out between the trough and the gate as in prior devices. In addition, due to the fact that the gate in the improved device is entirely separate from the means for varying the amount of seed distributed along the trough, the adjustment for differentiation of seed distribution along the trough will not interfere with the opening and closing of the gate. Also, the improved device permits each individual lip of the distributor to be canted for adjustments between the outer dimensions of the adjustable lip, and adjustments may be effected more readily and with greater ease than in prior devices without requiring unloosening of set screws and subsequent manipulation of adjusting devices.

Various modes of carrying out the invention are contemplated as being within the scope of the following claims particularly pointing out and distinctly claiming the subject matter that is regarded as the invention.

I claim:

1. A feed distributing device comprising, an elongated trough, an auger in said trough for conveying feed therealong, said trough being provided with a series of arcuately moveable bottom plates extending longitudinally thereof, a single swingable gate extending longitudinally along said trough for swinging movement toward and away from said bottom plates, and adjustment means for independently supporting and adjusting the position of each of said moveable bottom plates toward and away from said gate.

2. A feed distributing device comprising, an elongated trough, an auger conveyor operable within said trough, said trough including an elongated back plate and arcuate portion extending partially under said conveyor, an arcuate elongated extension plate adjustably mounted thereon for arcuate sliding movement relative thereto, gate supporting means extending longitudinally along the front of said trough remote from said back plate, a gate hingedly mounted on said support means and cooperating with said extension plate to form an adjustable discharge opening along a side of said trough when said gate is moved away from said extension plate, and means attached to said extension plate for adjusting the position thereof relative to said auger and said gate.

3. A feed distributing device according to claim 2, wherein said means attached to said extension plate includes a threaded supporting member, and a rod threadably engaging said supporting member and attached to said extension plate, whereby said extension plate is slideably adjusted relative to said back plate when said rod is rotated.

4. A feed distributing device according to claim 3, wherein said extension plate is provided with elongated apertures extending transversely thereof for receiving depending pins affixed to said back plate to support said extension plate in sliding relation to said back plate whereby the discharge opening between said gate and said extension plate is capable of being varied by rod rotation.

5. A feed distributing device according to claim 3, wherein said threaded supporting member is located above said extension plate and said rod is threadably engaged therewith in a substantially vertical position for slideably positioning said extension plate.

6. A feed distributing device according to claim 3, wherein said thread supporting member is located below said extension plate and said rod is threadably engaged therewith to slideably position said extension plate so that a variable discharge opening is provided between the gate and said extension plate.

7. A feed distributing device according to claim 5, wherein a rod is provided at each end of said bottom plate for slideably positioning said extension plate.

8. A feed distributing device according to claim 6, wherein a rod is provided at each end of said bottom plate for slideably positioning said extension plate.

9. A feed distributing device according to claim 2, wherein the trough includes a single elongated back plate which supports a plurality of elongated extension plates arranged therealong in series.

References Cited by the Examiner

UNITED STATES PATENTS

| | | | |
|---|---|---|---|
| 302,501 | 7/1884 | Kruse | 222—311 |
| 1,384,312 | 7/1921 | Fraser | 222—311 |
| 3,105,586 | 10/1963 | Carew et al. | 198—64 |
| 3,116,715 | 1/1964 | Krumheuer | 119—52 |

SAMUEL KOREN, *Primary Examiner.*

HUGH R. CHAMBLEE, *Examiner.*